(12) United States Patent
Kikuzawa

(10) Patent No.: US 12,138,844 B2
(45) Date of Patent: Nov. 12, 2024

(54) FLEXIBLE TUBE PRODUCTION APPARATUS

(71) Applicant: PLA GIKEN CO., LTD., Osaka (JP)

(72) Inventor: Yoshiharu Kikuzawa, Osaka (JP)

(73) Assignee: PLA GIKEN CO., LTD., Osaka (JP)

(*) Notice: Subject to any disclaimer, the term of this patent is extended or adjusted under 35 U.S.C. 154(b) by 488 days.

(21) Appl. No.: 17/392,306

(22) Filed: Aug. 3, 2021

(65) Prior Publication Data

US 2021/0362393 A1 Nov. 25, 2021

Related U.S. Application Data

(63) Continuation of application No. PCT/JP2020/024882, filed on Jun. 24, 2020.

(30) Foreign Application Priority Data

Jun. 26, 2019 (JP) .................................. 2019-118688

(51) Int. Cl.
 *B29C 48/10* (2019.01)
 *B29C 48/151* (2019.01)
 (Continued)

(52) U.S. Cl.
 CPC ............ *B29C 48/10* (2019.02); *B29C 48/151* (2019.02); *B29C 48/16* (2019.02); *B29C 48/255* (2019.02); *B29C 48/49* (2019.02)

(58) Field of Classification Search
 CPC ......... B29C 48/09; B29C 48/10; B29C 48/16; B29C 48/151; B29C 48/154;
 (Continued)

(56) References Cited

U.S. PATENT DOCUMENTS 4,888,146 A 12/1989 Dandeneau
6,808,380 B1 10/2004 Watanabe
(Continued)

FOREIGN PATENT DOCUMENTS

CN 107263839 A 10/2017
EP 3566851 A1 11/2019
(Continued)

OTHER PUBLICATIONS

International Search Report for related Application No. PCT/JP2020/024882, mailed Aug. 25, 2020.

*Primary Examiner* — Nahida Sultana
*Assistant Examiner* — Mohamed K Ahmed Ali
(74) *Attorney, Agent, or Firm* — Renner, Otto, Boisselle & Sklar, LLP

(57) ABSTRACT

Provided is a flexible tube production apparatus capable of shortening the length of a resin layer in which the mixing ratio between two kinds of resins changes. The flexible tube production apparatus includes: two extruders extruding resins different from each other; two valves provided corresponding to the two extruders, respectively; a kneading mechanism kneading the resins supplied from the two extruders via the two valves; a die extruding the resins kneaded by the kneading mechanism; and a control device controlling the two valves to switch from a first state where one extruder and the kneading mechanism communicate with each other and communication between the other extruder and the kneading mechanism is cut off, to a second state where the other extruder and the kneading mechanism communicate with each other and communication between the one extruder and the kneading mechanism is cut off, when the flexible tube is extruded.

6 Claims, 5 Drawing Sheets

(51) Int. Cl.
  *B29C 48/16* (2019.01)
  *B29C 48/255* (2019.01)
  *B29C 48/49* (2019.01)

(58) Field of Classification Search
  CPC .............. B29C 48/155; B29C 48/2528; B29C 48/2552; B29C 48/33; B29C 48/34; B29C 48/49
  See application file for complete search history.

(56) References Cited

U.S. PATENT DOCUMENTS

| | | |
|---|---|---|
| 2005/0003034 A1 | 1/2005 | Watanabe |
| 2017/0291344 A1 | 10/2017 | Maxson |
| 2017/0368733 A1 | 12/2017 | Kikuzawa |
| 2019/0351600 A1 | 11/2019 | Kikuzawa |

FOREIGN PATENT DOCUMENTS

| | | | |
|---|---|---|---|
| JP | H02-280765 A | | 11/1990 |
| JP | 2000-225615 A | | 8/2000 |
| JP | 2001-105472 A | | 4/2001 |
| JP | 2001-150516 A | | 6/2001 |
| JP | 6144862 B | | 5/2017 |
| JP | 6454803 B1 | * | 1/2019 |
| WO | 01/89802 A1 | | 11/2001 |
| WO | WO-2021024794 A1 | * | 2/2021 |

* cited by examiner

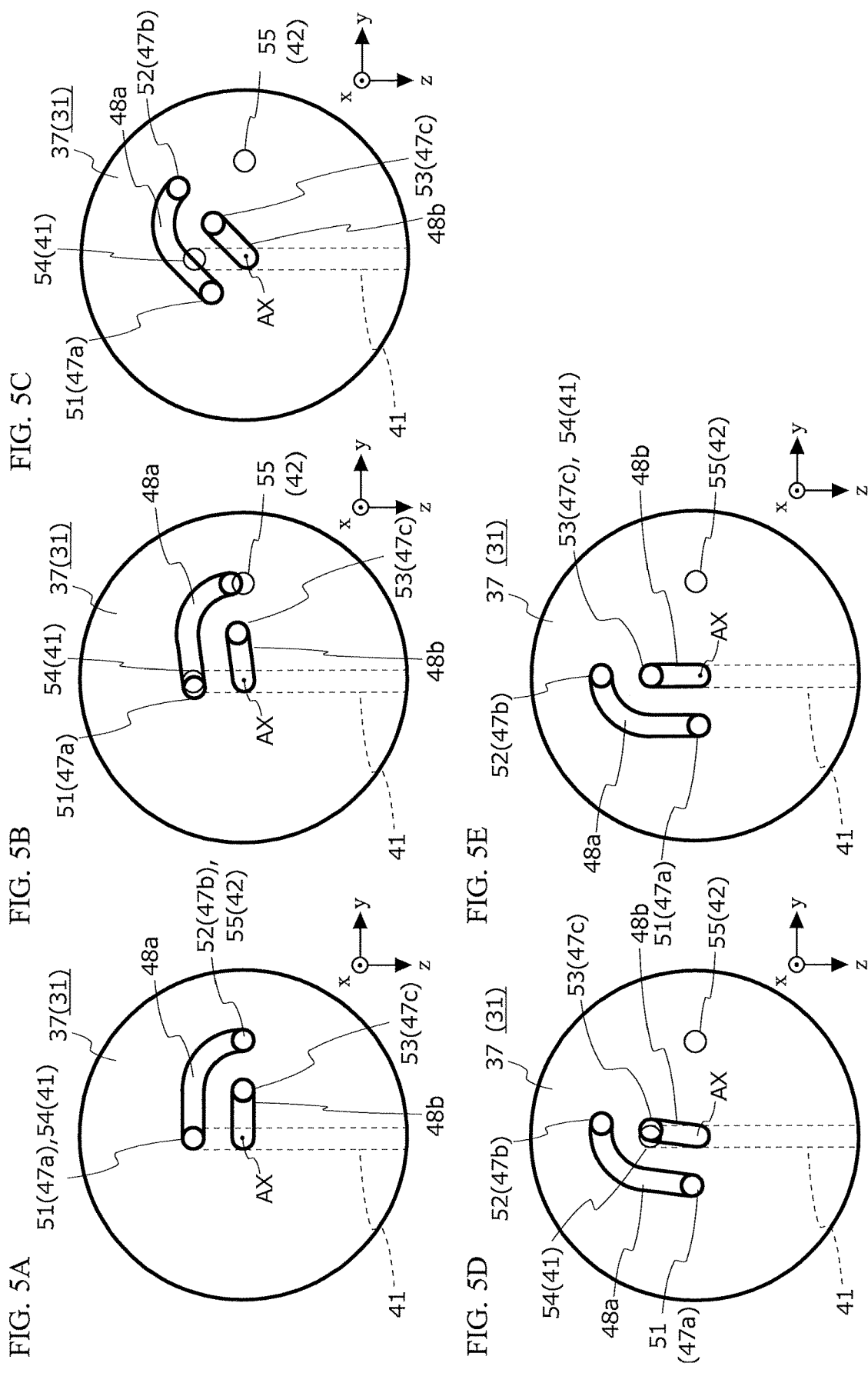

FLEXIBLE TUBE PRODUCTION APPARATUS

CROSS-REFERENCE TO RELATED APPLICATION

This application is a Continuation of International Application No. PCT/JP2020/024882, filed on Jun. 24, 2020, which in turn claims the benefits of Japanese Application No. 2019-118688 filed on Jun. 26, 2019, the disclosures of which Application are incorporated by reference herein.

BACKGROUND

Field

The present invention relates to a flexible tube production apparatus for extruding a flexible tube in which the outer surface of a blade wire is covered with a resin.

Description of the Related Art

In medical institutions, in order to inject a drug solution, a contrast medium, or the like to a predetermined site in the living body of a patient, or in order to take out body fluids or the like from the living body, a tube-shaped medical instrument called a catheter is used. Since the catheter is inserted into the living body through a winding blood vessel or the like, a leading end side portion of the catheter is required to have flexibility so as not to damage the blood vessel or the like and so as to easily bend along the winding portion of the blood vessel or the like. Meanwhile, the portion, of the catheter, that is not inserted into the living body is required to have moderate rigidity so as to facilitate manipulation of the catheter. Thus, various kinds of production apparatuses for catheters whose hardness is varied stepwise along the length direction thereof such that the leading end side is soft and the proximal end side is hard, have been proposed. For example, Japanese Patent No. 6144862 describes an apparatus capable of producing a flexible tube whose hardness is continuously varied along the length direction thereof, by extruding two kinds of resins having different hardnesses onto the outer surface of a blade wire while changing the mixing ratio between the two kinds of resins.

The length of the portion in which the mixing ratio between the two kinds of resins changes can be preferably adjusted according to the application of the flexible tube and the like. However, in the production apparatus described in Patent Literature 1, it is difficult to shorten the portion in which the mixing ratio between the two kinds of resins changes.

SUMMARY

Therefore, an object of the present invention is to provide a flexible tube production apparatus capable of shortening the length of a resin layer in which the mixing ratio between two kinds of resins changes.

A flexible tube production apparatus according to the present invention is a flexible tube production apparatus for extruding a flexible tube, including: two extruders configured to extrude resins different from each other; two valves provided corresponding to the two extruders, respectively; a kneading mechanism configured to knead the resins supplied from the two extruders via the two valves; a die having a through hole through which a blade wire is inserted, and an extrusion port through which the resins kneaded by the kneading mechanism are extruded onto a surface of the blade wire passing through the through hole; and a control device configured to control the two valves, wherein each of the valves is capable of switching between a state where the corresponding extruder and the kneading mechanism communicate with each other and a state where communication between the corresponding extruder and the kneading mechanism is cut off, and the control device controls the two valves to switch from a first state where one extruder and the kneading mechanism communicate with each other and communication between the other extruder and the kneading mechanism is cut off, to a second state where the other extruder and the kneading mechanism communicate with each other and communication between the one extruder and the kneading mechanism is cut off, when the flexible tube is extruded.

According to the present invention, a flexible tube production apparatus capable of shortening the length of a resin layer in which the mixing ratio between two kinds of resins changes, can be provided.

BRIEF DESCRIPTION OF THE DRAWINGS

FIGS. 5A-5E show schematic diagrams for describing operation of the first valve and a second valve shown in FIG. 1.

DETAILED DESCRIPTION

Hereinafter, embodiments of the present invention will be described. In the following, an example will be described in which the present invention is applied to a flexible tube production apparatus for a flexible tube having a configuration in which a blade (net tube) is provided on the outer surface of an inner layer tube that is a resin layer and the blade is further covered with an outer layer tube that is a resin layer. An example of such a flexible tube is a catheter shaft. However, the catheter shaft is merely an example of the flexible tube, and the present invention can also be applied to a production apparatus for a flexible tube having another usage such as a flexible tube used for an endoscope.

Figure 1:
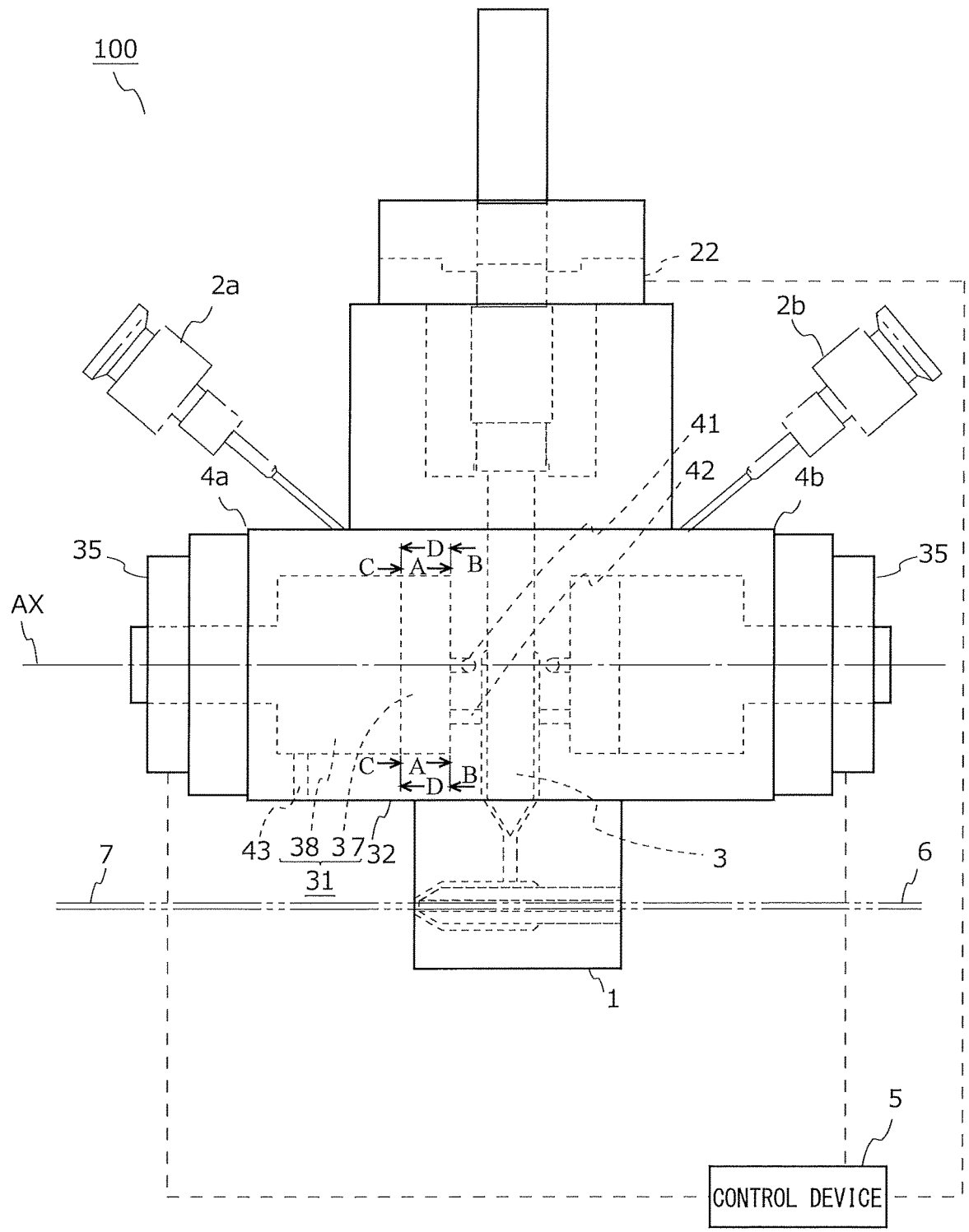
FIG. 1 is a plan view showing a schematic configuration of a flexible tube production apparatus according to an embodiment.
Figure 2:
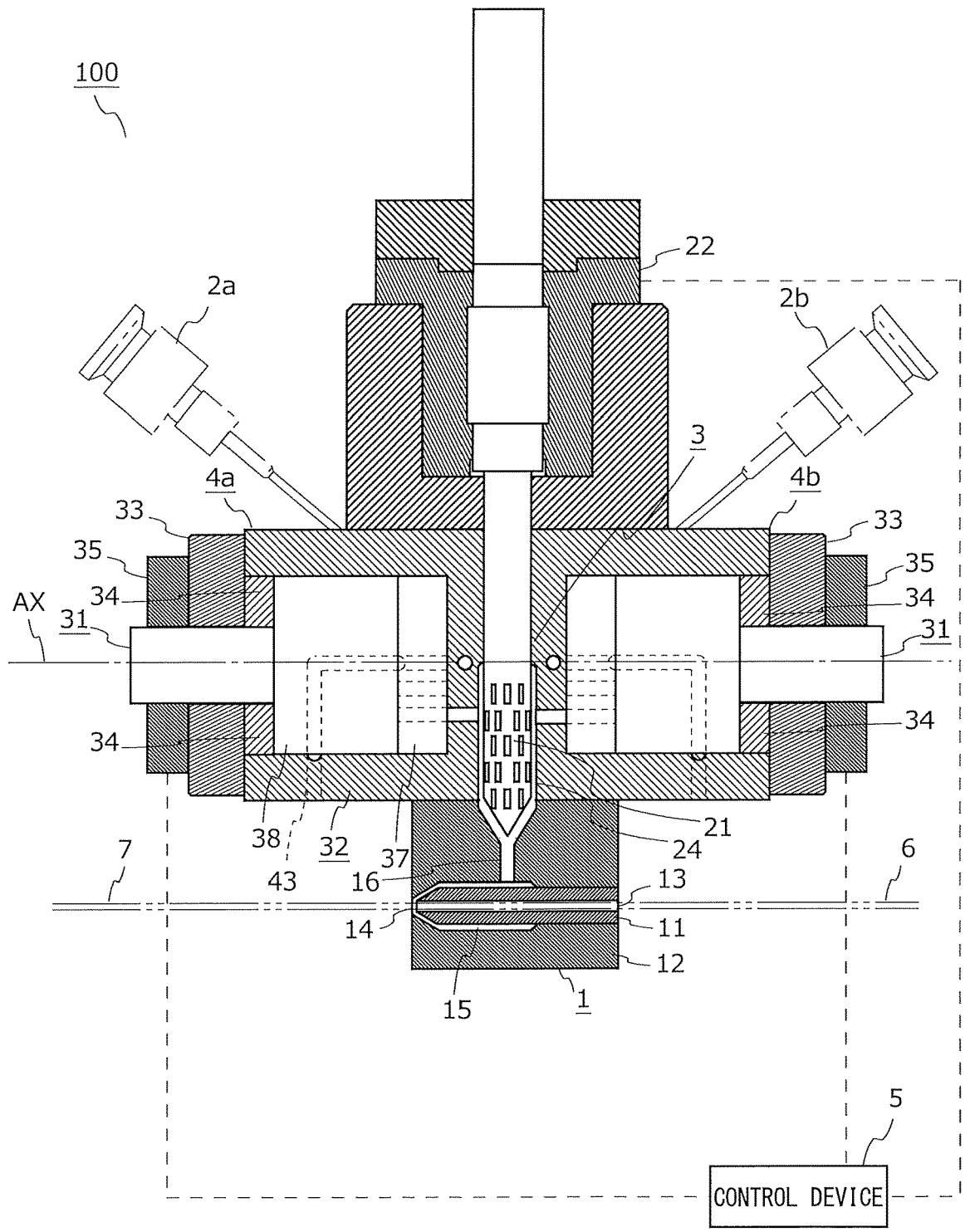
FIG. 2 is a partial cross-sectional view of the flexible tube production apparatus shown in FIG. 1.
Figure 3:
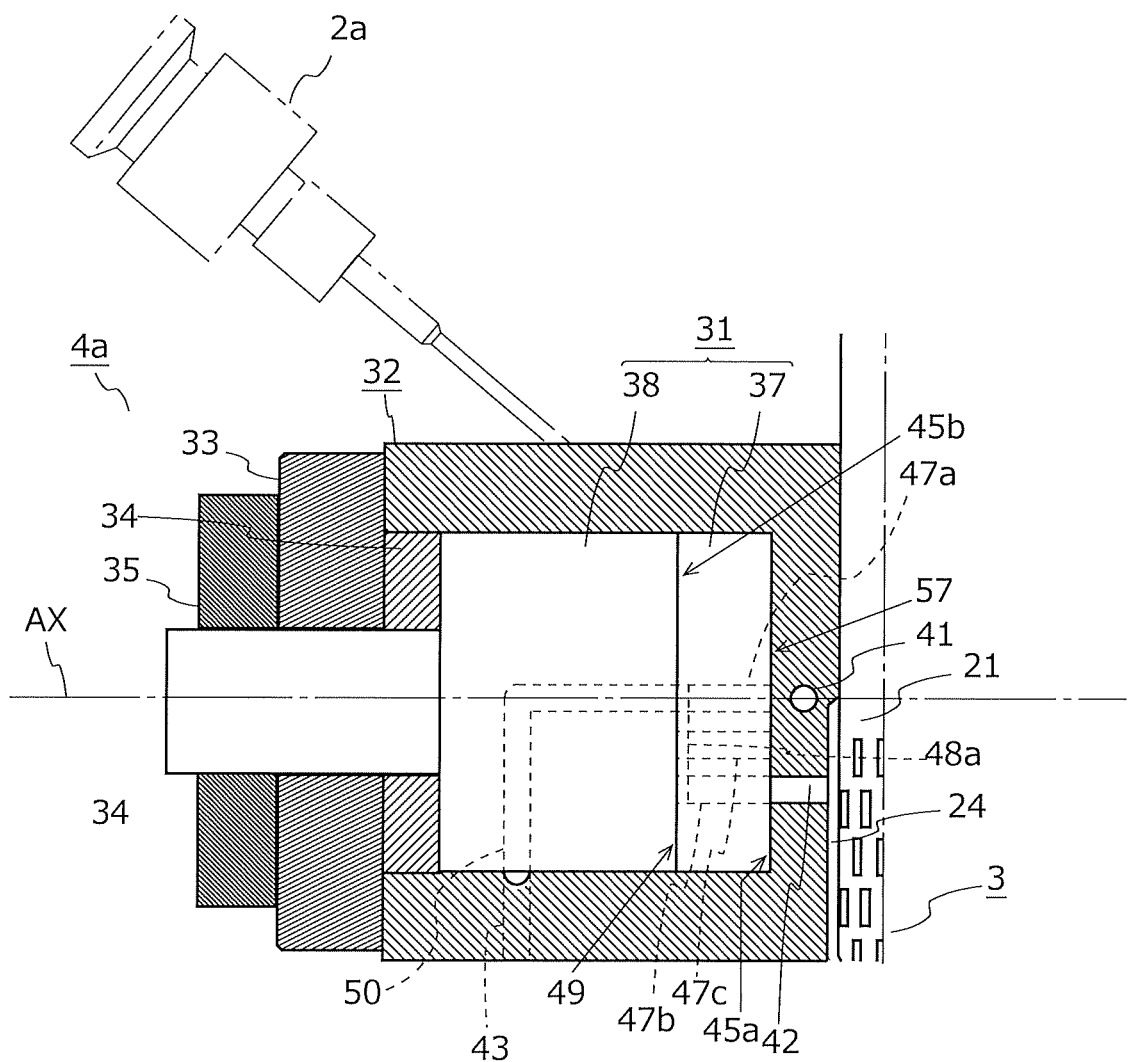
FIG. 3 is an enlarged view of a first valve shown in FIG. 2.

FIG. 1 is a plan view showing a schematic configuration of a flexible tube production apparatus according to an embodiment, FIG. 2 is a partial cross-sectional view of the flexible tube production apparatus shown in FIG. 1, and FIG. 3 is an enlarged view of a first valve shown in FIG. 2. FIG. 2 corresponds to a partial cross-sectional view in which the portion other than a valve body shown in FIG. 1 is cut along a plane parallel to an xz plane and including a central axis AX of the valve body.

A flexible tube production apparatus 100 is an apparatus for extruding a flexible tube 7 using resins, and includes a die 1, a first extruder 2a, a second extruder 2b, a kneading mechanism 3, a first valve 4a, a second valve 4b, and a control device 5. The flexible tube production apparatus 100 is fixed to a predetermined mounting base or the like with a pedestal interposed therebetween. Although not shown, a supply device for supplying a blade wire 6, a haul-off device for hauling off the extruded flexible tube 7, etc., are provided as appropriate on the upstream side and the downstream side of the die 1. The blade wire 6 is conveyed from the rear side of the die 1 to the front side of the die 1. In the following, a direction may be specified using an orthogonal coordinate system with three axes of xyz. An axis parallel to the conveyance direction of the blade wire 6 is defined as the x axis, an axis parallel to the vertical direction is defined as the y axis, and an axis orthogonal to the x axis and the y axis is defined as the z axis. The blade wire 6 is, for example, a wire in which a blade (net tube) is provided on an inner layer tube and a core wire (guide wire) is inserted into the hollow portion of the inner layer tube. The flexible tube 7 is a tube in which an outer layer tube composed of a resin layer is provided on the surface of the blade wire 6, and a catheter shaft can be obtained by pulling out the core wire of the blade wire 6 after the outer layer tube is molded.

The die 1 is a mold for extruding a resin onto the outer surface of the blade wire 6, and includes an inner mold 11 and an outer mold 12. The inner mold 11 is provided with a through hole 13, through which the blade wire 6 is inserted, at a central axis portion thereof. The outer mold 12 has a hollow portion, and the inner mold 11 is accommodated in the hollow portion. A resin flow path 15 composed of a predetermined gap is formed between the outer peripheral surface of the inner mold 11 and the inner peripheral surface of the hollow portion of the outer mold 12. The outer mold 12 has an extrusion port 14 coaxial with the central axis of the inner mold 11. The extrusion port 14 forms a front end portion of the flow path 15. In addition, the outer mold 12 is provided with a flow path 16 for supplying a resin from the kneading mechanism 3, which will be described later, to the flow path 15. The resin supplied to the flow path 16 flows to the extrusion port 14 through the flow path 15, and is extruded onto the surface of the blade wire 6 that is fed out through the through hole 13 and the extrusion port 14 of the inner mold 11. The inner mold 11 is fixed to the outer mold 12.

Each of the first extruder 2a and the second extruder 2b is, for example, a screw extruder, and can melt pellets of a resin and extrude the melted resin from a discharge port at an end thereof at a constant speed. A first resin and a second resin having different characteristics such as hardness are supplied to the first extruder 2a and the second extruder 2b, respectively. As an example, the first resin is a resin having a relatively high hardness, and the second resin is a resin that is more flexible than the first resin. The first resin extruded from the first extruder 2a and the second resin extruded from the second extruder 2b are supplied to the kneading mechanism 3, which will be described later, and kneaded by the kneading mechanism 3.

The kneading mechanism 3 can knead the supplied resins and supply the kneaded resins to the die 1. The kneading mechanism 3 according to the present embodiment includes, for example, a screw 21 accommodated in a hollow portion provided in a case 32, and a motor 22 for rotating the screw 21 about a central axis thereof. The case 32 is a metal block integrally formed with a case of the first valve 4a and a case of the second valve 4b which will be described later. In the present specification, the case in which the screw 21 is accommodated and the cases in which the valve bodies of the first valve 4a and the second valve 4b are accommodated are not distinguished from each other and are referred to as case 32. A flow path 24 composed of a predetermined gap is formed between the outer peripheral surface of the screw 21 and the inner peripheral surface of the hollow portion of the case 32. A plurality of projections or pins are provided on the outer peripheral surface of the screw 21, and the resins in the flow path 24 can be kneaded when the screw 21 is rotated about the central axis thereof by the rotational force of the motor 22. In the present embodiment, the example in which the kneading mechanism 3 is configured by using the screw 21 has been described, but the kneading mechanism 3 is not particularly limited as long as the resins in the flow path 24 can be kneaded, and a kneader may be used instead of the screw 21. The rotation of the motor 22 is controlled by the control device 5 which will be described later.

The first valve 4a and the second valve 4b are provided corresponding to the first extruder 2a and the second extruder 2b, respectively. The first valve 4a is for controlling the connection state between the corresponding first extruder 2a and the kneading mechanism 3, and is capable of switching between a state where the first extruder 2a and the kneading mechanism 3 communicate with each other and a state where communication between the first extruder 2a and the kneading mechanism 3 is cut off. The second valve 4b is for controlling the connection state between the corresponding second extruder 2b and the kneading mechanism 3, and is capable of switching between a state where the second extruder 2b and the kneading mechanism 3 communicate with each other and a state where communication between the second extruder 2b and the kneading mechanism 3 is cut off. The first valve 4a and the second valve 4b will be described in detail later.

The control device 5 includes a computer which controls the kneading mechanism 3, the first valve 4a, and the second valve 4b. The control device 5 is connected to the motor 22 of the kneading mechanism 3 and controls the rotation of the screw 21. In addition, the control device 5 is connected to motors 35 included in the first valve 4a and the second valve 4b, and switches the connection states of the flow paths by the first valve 4a and the second valve 4b. The control by the control device 5 will be described in detail later.

Hereinafter, the configurations of the first valve 4a and the second valve 4b will be described in detail with reference to FIG. 1 to FIG. 4.

Figure 4A:
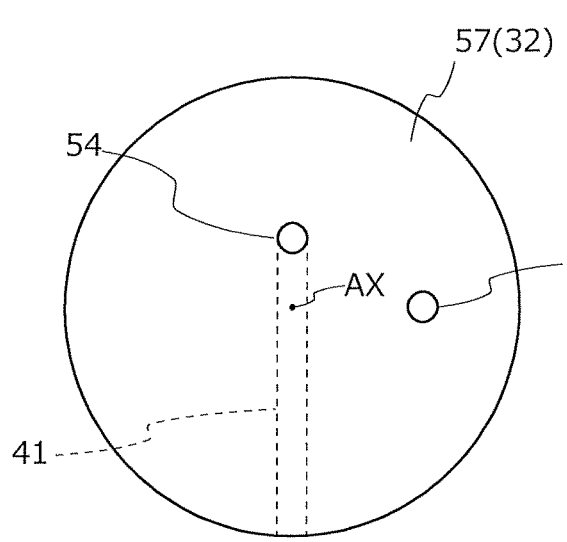
FIG. 4A shows a cross-sectional view, corresponding to an A arrow view, of the first valve shown in FIG. 1.
Figure 4B:
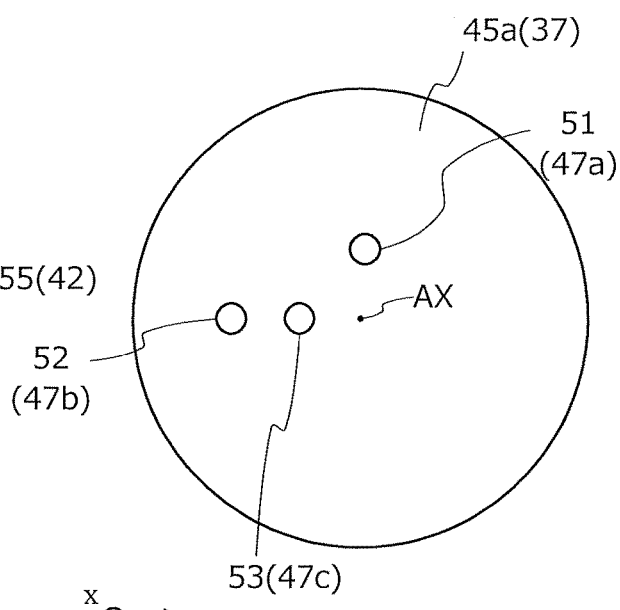
FIG. 4B shows a cross-sectional view, corresponding to a B arrow view, of the first valve shown in FIG. 1.
Figure 4C:
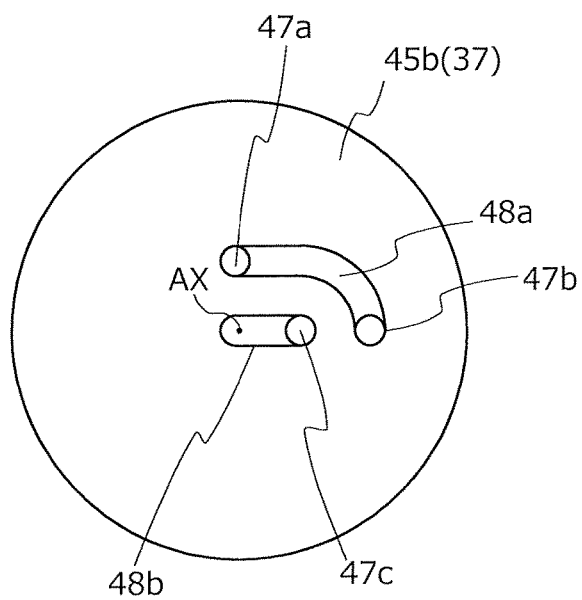
FIG. 4C shows a cross-sectional view, corresponding to a C arrow view, of the first valve shown in FIG. 1.
Figure 4D:
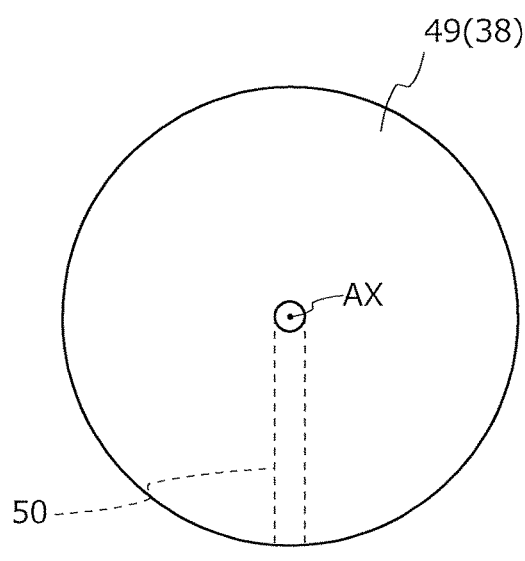
FIG. 4D shows a cross-sectional view, corresponding to a D arrow view, of the first valve shown in FIG. 1.

FIGS. 4A-4D show cross-sectional views of the first valve shown in FIG. 1, and FIG. 4A, FIG. 4B, FIG. 4C, and FIG. 4D correspond to an A arrow view, a B arrow view, a C arrow view, and a D arrow view in FIG. 1, respectively. FIG. 4A shows a flat surface portion of the case, FIG. 4B and FIG. 4C show end surfaces of a first division body 37, and FIG. 4D shows an end surface of a second division body.

The first valve 4a includes a valve body 31 which is rotatable about a central axis AX thereof, the case 32 in which the valve body 31 is rotatably accommodated, a mounting member 33 for mounting the valve body 31 to the case 32, a spacer 34 interposed between the mounting member 33 and the valve body 31, and the motor 35 for rotating the valve body 31.

In the present embodiment, the valve body 31 includes the first division body 37 and a second division body 38 as shown in FIG. 1 to FIG. 3.

The first division body 37 is a member having a columnar shape and having a pair of end surfaces 45a and 45b orthogonal to the central axis AX of the valve body 31. As shown in FIG. 4B and FIG. 4C, in the first division body 37, three through holes 47a to 47c having a circular cross section are provided at positions eccentric from the central axis AX of the valve body 31, so as to extend parallel to the central axis AX. Accordingly, an opening 51 which is one end of the through hole 47a, an opening 52 which is one end of the through hole 47b, and an opening 53 which is one end of the through hole 47c are formed on the end surface 45a shown in FIG. 4B. In addition, as shown in FIG. 4C, a groove 48a connecting the other ends of the through holes 47a and 47b and a groove 48b connecting the other end of the through hole 47c and the center of the end surface 45b are formed on the other end surface 45b of the first division body 37. The diameters of the openings 51 to 53 are equal to each other, and the openings 51 and 53 are rotationally symmetrical with respect to the center of the end surface 45a (position of the central axis AX) (that is, the distance between the opening 51 and the center of the end surface 45a and the distance between the opening 53 and the center of the end surface 45a are equal to each other).

The second division body 38 is a member having an end surface 49 orthogonal to the central axis AX of the valve body 31 and having a portion that has a diameter equal to that of the first division body 37 and has a columnar shape. As shown in FIG. 3 and FIG. 4D, the second division body 38 is provided with a flow path 50. In the present embodiment, the flow path 50 is formed in an L shape including a portion extending in the radial direction of the second division body 38 and a portion extending in the central axis direction of the second division body 38. One end of the flow path 50 is located on the outer peripheral surface of the second division body 38, and the other end of the flow path 50 is located at the center of the end surface 49.

The first division body 37 and the second division body 38 are integrated with each other by using a fixing member such as a bolt extending in a direction parallel to the central axis AX. In a state where the first division body 37 and the second division body 38 are integrated with each other, an end of the groove 48b provided in the first division body 37 (the center portion of the end surface 45b) and an end of the flow path 50 provided in the second division body 38 (the center portion of the end surface 49) overlap each other. In the case where the first division body 37 and the second division body 38 are fixed with a bolt, the bolt is mounted in portions where no through hole or groove is formed. When the above-mentioned first division body 37 and second division body 38 are integrated to form the valve body 31, a first flow path connecting the openings 51 and 52 on the end surface 45a and a second flow path having an end that is the opening 53 on the end surface 45a are formed in the valve body 31. The first flow path is a flow path that passes through the opening 51, the through hole 47a, the groove 48a, the through hole 47b, and the opening 52 in this order. The second flow path is a flow path that passes through the opening 53, the through hole 47c, the groove 48b, and the flow path 50 in this order. The flow of the resins will be described later. The opening 51 corresponds to the upstream end of the first flow path, the opening 52 corresponds to the downstream end of the first flow path, and the opening 53 corresponds to the upstream end of the second flow path.

The case 32 has a hollow portion having an inner diameter substantially equal to the outer diameter of the first division body 37 and having a columnar shape, and a columnar portion composed of the first division body 37 and a part of the second division body 38 and having a constant diameter is accommodated in the hollow portion. In addition, the case 32 has a flat surface portion 57 which is orthogonal to the central axis AX of the valve body 31 and in contact with the end surface 45a of the valve body 31. In a state where the valve body 31 is accommodated in the hollow portion of the case 32, the valve body 31 is rotatable while sliding the outer peripheral surface and the end surface 45a of the valve body 31 on the inner peripheral surface of the hollow portion and the flat surface portion 57 of the case 32, respectively.

As shown in FIG. 2 and FIG. 4A, the case 32 is provided with a first resin supply path 41 which communicates with an extrusion port of the first extruder 2a, a second resin supply path 42 which communicates with the flow path 24 of the kneading mechanism 3, and a resin discharge path 43 for discharging (discarding) the resin supplied to the valve body 31, to the outside of the case 32. As shown in FIG. 4A, an opening 54 which is the downstream end of the first resin supply path 41, and an opening 55 which is the upstream end of the second resin supply path 42 are formed on the flat surface portion 57 of the case 32. The openings 54 and 55 have a diameter equal to those of the openings 51 to 53 provided on the end surface 45a of the first division body 37. The distance between the center of the opening 54 and the center of the flat surface portion 57 (the point at which the flat surface portion 57 intersects the central axis AX) is equal to the distance between the center of the opening 51 (opening 53) provided on the end surface 45a of the first division body 37 and the center of the end surface 45a. In addition, the distance between the center of the opening 55 and the center of the flat surface portion 57 (the point at which the flat surface portion 57 intersects the central axis AX) is equal to the distance between the center of the opening 52 provided on the end surface 45a of the first division body 37 and the center of the end surface 45a.

Although not shown, the upstream end of the first resin supply path 41 is provided on the lower surface side of the case 32 (the back sides of the sheets of FIG. 1 and FIG. 2). In addition, the first resin supply path 41 is bent inside the case 32, and the resin extruded from the first extruder 2a flows in the y-axis positive direction from the upstream end of the first resin supply path 41, then changes the direction thereof at the bent portion of the first resin supply path 41 to flow in the x-axis positive direction, and reaches the opening 54 which is the downstream end of the first resin supply path 41. In addition, the length of the second resin supply path 42 is designed to be as short as possible. The resin discharge path 43 is configured to communicate with the second flow path, which is provided in the valve body 31, at least when the valve body 31 is at a second rotation position (described later). The resin discharge path 43 and the second flow path of the valve body 31 may be connected to each other via a groove provided on the inner peripheral surface of the hollow portion of the case 32.

The valve body 31 is mounted to the case 32 by sealing the opening of the case 32 with the mounting member 33 in a state where the columnar portion of the valve body 31 is accommodated in the hollow portion of the case 32. The mounting member 33 can be fastened to the case 32, for example, using a bolt which is not shown. The spacer 34 which is made of, for example, metal and has an annular shape is interposed between the valve body 31 and the mounting member 33. The thickness of the spacer 34 is set to be larger than the depth of a space formed in the hollow portion in a state where the valve body 31 is inserted, such that the outer surface of the spacer 34 is located slightly outward of the end surface at the open end of the case 32. By fixing the mounting member 33 to the case 32 with the spacer 34 interposed between the valve body 31 and the mounting member 33, the end surface 45a of the valve body 31 can be pressed against the flat surface portion 57 of the case 32 with a predetermined contact pressure. That is, in the present embodiment, the mounting member 33 and the spacer 34 serve as pressing members that press the end surface 45a of the valve body 31 against the flat surface portion 57 of the case 32. By applying, to the valve body 31, a pressing force toward the flat surface portion 57 side of the case 32, movement of the valve body 31 in a direction parallel to the central axis is restricted, and the adhesion of the end surface 45a of the valve body 31 to the flat surface portion 57 of the case 32 can be improved to inhibit the resin from seeping out at the contact surface. The contact pressure of the end surface 45a of the valve body 31 can be controlled by, for example, the tightening torque of the bolt for fixing the mounting member 33 to the case 32. If the end surface 45a of the valve body 31 or the flat surface portion 57 of the case 32 is worn, the contact pressure of the valve body 31 can be kept constant by replacing the spacer 34 with a thicker one or adjusting the tightening torque of the bolt for fixing the mounting member 33 to the case 32. That is, the first valve 4a according to the present embodiment is configured to take in and out the resin between the valve body 31 and the case 32 via a flat surface (the end surface 45a and the flat surface portion 57) orthogonal to the central axis, and thus has excellent maintainability due to the flatness of the end surface 45a and the flat surface portion 57 and easy adjustment of the contact pressure therebetween.

The second valve 4b is configured to be substantially the same as the first valve 4a, and includes a valve body 31 which is rotatable about a central axis AX thereof, the case 32 in which the valve body 31 is rotatably accommodated, a mounting member 33 for mounting the valve body 31 to the case 32, a spacer 34 interposed between the mounting member 33 and the valve body 31, and the motor 35 for rotating the valve body 31. In the present embodiment, the first valve 4a and the second valve 4b are configured symmetrically with respect to the plane including a yz plane and the central axis of the screw 21, and the arrangement of the flow paths, the grooves, etc., provided in the valve body 31 and the case 32 is also symmetrical to the arrangement of those provided in the first valve 4a. Therefore, the repetitive description of the second valve 4b is omitted. It should be noted that the first valve 4a and the second valve 4b do not necessarily have to be configured to be symmetrical with respect to a predetermined plane, and the valve bodies 31 included in the first valve 4a and the second valve 4b may be exactly the same, and the arrangement of the flow paths provided in the case 32 may be changed. In addition, in the present embodiment, the case of the first valve 4a, the case of the second valve 4b, and the case in which the screw 21 of the kneading mechanism 3 is accommodated are integrally formed as a single member, but may be formed as separate members.

Here, change in the rotation position of the valve body 31 with respect to the case 32 will be described.

FIGS. 5A-5E show schematic diagrams for describing operation of the first valve and the second valve shown in FIG. 1. FIG. 5A to FIG. 5E each show the positional relationship between the end surface 45b of the first division body 37 seen from a line C-C shown in FIG. 1 and the first resin supply path 41 and the second resin supply path 42 provided in the case 32. For simplification of the illustration, in FIGS. 5A-5E, the part related to the first division body 37 is shown by a thick solid line, and the part related to the case 32 is shown by a normal solid line. The part related to the case 32 is located on the back side of the sheet of FIG. 5A-5E. In addition, for simplification of the illustration, the flow path provided in the second division body 38 is not shown, and, as described above, the groove 48b provided in the first division body 37 is connected to the resin discharge path 43 via the flow path 50 provided in the second division body 38.

FIG. 5A shows a state where the valve body 31 is at a first rotation position. When the valve body 31 is at the first rotation position, as shown in FIG. 5A, the opening 51, which is the upstream end of the first flow path, overlaps the opening 54 provided in the case 32, and the opening 52, which is the downstream end of the first flow path, overlaps the opening 55 provided in the case 32. Accordingly, the first resin supply path 41 and the second resin supply path 42 are connected to each other via the first flow path, so that the first extruder 2a and the kneading mechanism 3 communicate with each other. In addition, the opening 53, which is the upstream end of the second flow path, is closed by the flat surface portion 57. Therefore, when the valve body 31 is at the first rotation position as shown in FIG. 5A, all the resin extruded from the first extruder 2a can be supplied to the kneading mechanism 3.

FIG. 5B to FIG. 5D each show a state where the valve body 31 is at a rotation position between the first rotation position and the second rotation position. In the process in which the valve body 31 rotates from the first rotation position to the second rotation position, the positions of the openings 51 to 53 change with respect to the openings 54 and 55 as shown in FIG. 5B to FIG. 5D.

FIG. 5E shows a state where the valve body 31 is at the second rotation position. When the valve body 31 is at the second rotation position, as shown in FIG. 5E, the opening 53, which is the upstream end of the second flow path, overlaps the opening 54 provided in the case 32. Accordingly, the first resin supply path 41 and the resin discharge path 43 are connected to each other via the second flow path. In addition, the openings 51 and 52 at both ends of the first flow path are closed by the flat surface portion 57, and the opening 55 provided in the case 32 is closed by the end surface 45a of the valve body 31. When the valve body 31 is at the second rotation position, communication between the first extruder 2a and the kneading mechanism 3 is cut off, and all the resin extruded from the first extruder 2a is discharged (discarded) to the outside via the second flow path.

Since the second valve 4b is configured to be substantially the same as the first valve 4a, the flow path is switched by rotation of the valve body 31 of the second valve 4b in the same manner as the first valve 4a described with reference to FIGS. 5A-5E. That is, when the valve body 31 of the second valve 4b is at the first rotation position, the second extruder 2b and the kneading mechanism 3 communicate with each other, and, when the valve body 31 of the second valve 4b is at the second rotation position, communication between the second extruder 2b and the kneading mechanism 3 is cut off.

Here, a method for controlling the first valve 4a and the second valve 4b by the control device 5 when extruding a flexible tube while changing the mixing ratio between the first resin and the second resin will be described. Specifically, in the following, an example in which the first resin is extruded onto the surface of the blade wire, and then a mixed resin (resin obtained by kneading the first resin and the second resin) is extruded while gradually increasing the proportion of the second resin, to form a flexible tube, will be described.

First, the control device 5 controls the first valve 4a and the second valve 4b so as to shift to a first state where the first extruder 2a communicates with the kneading mechanism 3 and communication between the second extruder 2b and the kneading mechanism 3 is cut off. Specifically, the control device 5 controls the respective motors 35 of the first valve 4a and the second valve 4b to locate the valve body 31 of the first valve 4a at the first rotation position (FIG. 5A) and locate the valve body 31 of the second valve 4b at the second rotation position (FIG. 5E). In this state, all the first resin extruded from the first extruder 2a is supplied to the kneading mechanism 3, and all the second resin extruded from the second extruder 2b is discharged to the outside. Therefore, when the first resin and the second resin are extruded from the first extruder 2a and the second extruder 2b while feeding out the blade wire inserted through the die 1, the first resin is supplied to the die 1 through the kneading mechanism 3 and extruded onto the surface of the blade wire.

Next, the control device 5 controls the first valve 4a and the second valve 4b so as to shift to a second state where communication between the first extruder 2a and the kneading mechanism 3 is cut off and the second extruder 2b and the kneading mechanism 3 communicate with each other. Specifically, the control device 5 controls the respective motors 35 of the first valve 4a and the second valve 4b to rotate the valve body 31 of the first valve 4a to the second rotation position (FIG. 5E) and rotate the valve body 31 of the second valve 4b to the first rotation position (FIG. 5A). In this state, all the second resin extruded from the second extruder 2b is supplied to the kneading mechanism 3, and all the first resin extruded from the first extruder 2a is discharged to the outside.

After the control device 5 switches the first valve 4a and the second valve 4b from the first state to the second state, only the second resin is supplied to the kneading mechanism 3, and the first resin supplied before switching to the second state remains in the flow path 24 of the kneading mechanism 3. Even when the resin supplied to the flow path 24 is switched from the first resin (100%) to the second resin (100%), due to the difference in fluidity between the two kinds of resins, etc., the first resin remaining in the flow path is not immediately extruded by the second resin supplied later, and it takes some time for the first resin remaining in the flow path to be completely replaced with the second resin. Therefore, in the present invention, by utilizing the characteristic that the resin in the flow path 24 is not replaced immediately, the resin supplied to the kneading mechanism 3 is completely switched from the first resin to the second resin when starting mixing of the two kinds of resins. Only the first resin remaining in the flow path 24 of the kneading mechanism 3 is used as the first resin for forming the resin layer in which the mixing ratio between the first resin and the second resin changes. The first resin remaining in the flow path 24 of the kneading mechanism 3 is extruded first while being kneaded with the second resin, but the proportion of the second resin in the kneaded resin gradually increases since the supply of the first resin has been stopped. Therefore, by switching the resin supplied to the kneading mechanism 3, it is possible to gradually change the mixing ratio between the two kinds of resins for forming the outer layer tube. In a configuration in which the mixing ratio between the first resin and the second resin is gradually changed in accordance with the degree of opening and closing of a valve or the like, the time for which the two kinds of resins are simultaneously supplied becomes longer, so that the length of a portion in which the mixing ratio between the two kinds of resins changes tends to be longer. On the other hand, in the flexible tube production apparatus 100 according to the present embodiment, there can be no time for which the first resin and the second resin are simultaneously supplied, or the time for which the first resin and the second resin are simultaneously supplied can be shortened, by switching the resin supplied to the kneading mechanism 3 from the first resin to the second resin when extruding a portion in which the mixing ratio between the two kinds of resins changes. Thus, the length of the portion in which the mixing ratio between the two kinds of resins changes can be made shorter than that in the conventional art.

Therefore, according to the present embodiment, the flexible tube production apparatus 100 which is capable of providing a resin layer in which the mixing ratio between two kinds of resins gradually changes in the length direction and shortening the length of a portion in which the mixing ratio between two kinds of resins changes, can be realized.

Moreover, in the flexible tube production apparatus 100 according to the present embodiment, it is possible to switch between a state where the extruder and the kneading mechanism 3 communicate with each other and a state where communication between the extruder and the kneading mechanism 3 is cut off, in accordance with the rotation position of the valve body 31 of each of the first valve 4a and the second valve 4b, and, in a state where communication between the extruder and the kneading mechanism 3 is cut off, the resin extruded from the extruder can be discarded to the outside. Variation in the pressure of the resin existing in the flow path connected to the extruder can be suppressed by discharging the resin that is not selected as the resin to be supplied to the die 1, to the outside as described above. Thus, variation in the extrusion amount of the resin immediately after the kind of resin to be supplied to the kneading mechanism 3 is switched can be suppressed, and the dimensional stability of the outer diameter of the flexible tube can be improved.

Moreover, in the flexible tube production apparatus 100 according to the present embodiment, as a result of overlapping of the openings 51 and 52, which are provided on the end surface 45a orthogonal to the central axis AX of the valve body 31, with the openings 54 and 55 provided on the flat surface portion 57 of the case 32, the corresponding extruder and the kneading mechanism 3 communicate with each other. In such a configuration, by applying a predetermined contact pressure to the end surface 45a of the valve body 31 using the spacer 34 and the mounting member 33, the adhesion between the end surface 45a of the valve body 31 and the flat surface portion 57 of the case 32 can be improved, and seepage of the resin and the like can be suppressed.

Moreover, in the flexible tube production apparatus 100 according to the present embodiment, by closing the opening 55, which is provided on the flat surface portion 57 of the case 32, with the end surface 45a of the valve body 31, communication between the corresponding extruder and the kneading mechanism 3 is cut off. By closing the second resin supply path 42 (opening 55) for supplying the resin to the kneading mechanism 3 with the end surface 45a of the valve body, the resin remaining in the flow path provided in the valve body 31 can be inhibited from entering the flow path 24 of the kneading mechanism 3, which is effective for shortening the length of the portion in which the mixing ratio between the two kinds of resins changes. In addition, by closing the second resin supply path 42 (opening 55) for supplying the resin to the kneading mechanism 3 with the end surface 45a of the valve body, the resin in the flow path 24 of the kneading mechanism 3 can be inhibited from flowing back into the valve body 31 through the second resin supply path 42, and the two kinds of resins can be prevented from being mixed inside the valve body 31.

In the flexible tube production apparatus 100 according to the present embodiment, the resin kneaded by the kneading mechanism 3 is directly supplied to the die 1, but the resin may be supplied from the kneading mechanism 3 to the die 1 via a valve or the like provided between the kneading mechanism 3 and the die 1. For example, a flexible tube is known in which a flexible tubular portion called a soft tip is provided at a leading end portion after a resin layer in which the mixing ratio between two kinds of resins gradually changes in the length direction thereof is extruded. For example, in order to continuously and integrally extrude this soft tip and the portion in which the mixing ratio between the two kinds of resins changes, a third extruder for extruding a third resin, and a switching valve for selectively supplying either the resin kneaded by the kneading mechanism 3 or the third resin extruded from the third extruder, to the die 1, may be provided in the flexible tube production apparatus 100 according to the present embodiment.

Moreover, in the flexible tube production apparatus 100 according to the present embodiment, from the viewpoint of making the portion in which the mixing ratio between the two kinds of resins changes as short as possible, the rotation speed of the valve body 31 is preferably increased when the valve body 31 is rotated from the first rotation position to the second rotation position or from the second rotation position to the first rotation position. Further, it is possible to adjust the length of the portion in which the mixing ratio between the two kinds of resins changes to be longer by decreasing the rotation speed of the valve body 31. For example, in the above example, when the state of the first valve 4a and the second valve 4b is changed from the first state to the second state, the timing when the supply of the first resin to the kneading mechanism 3 is stopped and the timing when the speed at which the second resin is supplied to the kneading mechanism 3 is maximized can be delayed by decreasing the rotation speeds of the valve bodies 31 of the first valve 4a and the second valve 4b, so that the length of the portion in which the mixing ratio between the two kinds of resins changes can be made longer.

Moreover, in the present embodiment, the configuration in which the kneading mechanism 3 and the die 1 are separately configured and the die 1 is provided on the downstream side of the kneading mechanism 3 has been described as an example, but the present invention can also be applied to a configuration in which the kneading mechanism and the die are integrally configured and the resins supplied from the first extruder 2a and the second extruder 2b via the first valve 4a and the second valve 4b are extruded onto the blade wire. As the die for extruding the two kinds of resins onto the surface of the blade wire while kneading the two kinds of resins, the configuration described in International Publication No. WO2019/177018 can be adopted. That is, the die may be composed of a tubular member having a through hole through which a blade wire is inserted from one end to the other end, a tubular inner mold which is rotatable about the tubular member as a central axis by driving means, and an outer mold which surrounds the inner mold such that a predetermined gap is formed between the outer surface of the inner mold and the outer mold, and the flexible tube production apparatus may be configured such that the above first valve and second valve are provided between a resin flow path formed between the outer mold and the inner mold and the two extruders. In the case where the kneading mechanism and the die are integrally configured, the volume of the flow path between the valve and the extrusion port of the die can be further reduced, so that the length of the portion in which the mixing ratio between the two kinds of resins changes can be made even shorter.

Moreover, in the above embodiment, the example of covering the surface of the blade wire, in which the blade is provided on the outer surface of the inner layer tube, while changing the mixing ratio between the two kinds of resins has been described, but it is also possible to produce a flexible tube in which the outer surface of a tube having no blade wire is covered with a resin layer, by using the production apparatus according to the present embodiment.

Moreover, the configurations and control of the valves according to the present embodiment can also be applied to a production apparatus for directly extruding (tube-molding) a tube from a mold.

The present invention can be used as a production apparatus for a flexible tube such as a catheter shaft to be used for producing a medical catheter and a tube to be used for an endoscope.

As presented above, the embodiments have been described as examples of the technology according to the present disclosure. For this purpose, the accompanying drawings and the detailed description are provided.

Therefore, components in the accompanying drawings and the detailed description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof

What is claimed is:

1. A flexible tube production apparatus for extruding a flexible tube, comprising:
   two extruders configured to extrude resins different from each other;
   two valves provided corresponding to the two extruders, respectively;
   a kneading mechanism configured to knead the resins supplied from the two extruders via the two valves;
   a die having a through hole through which a blade wire is inserted, and an extrusion port through which the resins kneaded by the kneading mechanism are extruded onto a surface of the blade wire passing through the through hole; and
   a control device configured to control the two valves, wherein
   each of the valves is capable of switching between a state where the corresponding extruder and the kneading mechanism communicate with each other and a state where communication between the corresponding extruder and the kneading mechanism is cut off,
   the control device controls the two valves to switch from a first state where one extruder and the kneading mechanism communicate with each other and communication between the other extruder and the kneading mechanism is cut off, to a second state where the other extruder and the kneading mechanism communicate with each other and communication between the one extruder and the kneading mechanism is cut off, when the flexible tube is extruded, each of the valves includes
- a valve body having a pillar shape and rotatable about a central axis thereof between a first rotation position and a second rotation position, and
- a case in which the valve body is rotatably accommodated, the case is provided with a first resin supply path which communicates with the corresponding extruder, a second resin supply path which communicates with the kneading mechanism, and a resin discharge path for discharging the resin to the outside of the case, the valve body is provided with
- a first flow path which causes the first resin supply path and the second resin supply path to communicate with each other when the valve body is at the first rotation position, and
- a second flow path which causes the first resin supply path and the resin discharge path to communicate with each other when the valve body is at the second rotation position, the control device controls rotation of the valve body of each of the valves such that in the first state, the valve body of one valve corresponding to the one extruder is located at the first rotation position and the valve body of the other valve corresponding to the other extruder is located at the second rotation position, and in the second state, the valve body of the one valve corresponding to the one extruder is located at the second rotation position and the valve body of the other valve corresponding to the other extruder is located at the first rotation position, the valve body has an end surface orthogonal to the central axis, and a first opening which is an upstream end of the first flow path, a second opening which is a downstream end of the first flow path, and a third opening which is an upstream end of the second flow path are provided on the end surface so as to be eccentric from the central axis of the valve body, the case has a flat surface portion which is in surface contact with the end surface of the valve body, and a fourth opening which is a downstream end of the first resin supply path and a fifth opening which is an upstream end of the second resin supply path are provided on the flat surface portion, and when the valve body is at the first rotation position, the first opening overlaps the fourth opening, the second opening overlaps the fifth opening, and the third opening is closed by the flat surface portion, and when the valve body is at the second rotation position, the third opening overlaps the fourth opening, the first opening and the second opening are closed by the flat surface portion, and the fifth opening is closed by the end surface.

2. The flexible tube production apparatus according to claim 1, wherein each of the valves further includes a pressing member pressing the end surface of the valve body against the flat surface portion of the case.

3. The flexible tube production apparatus according to claim 1, wherein the die is provided on a downstream side of the kneading mechanism.

4. The flexible tube production apparatus according to claim 2, wherein the die is provided on a downstream side of the kneading mechanism.

5. The flexible tube production apparatus according to claim 1, wherein the kneading mechanism and the die are integrally configured.

6. The flexible tube production apparatus according to claim 2, wherein the kneading mechanism and the die are integrally configured.

* * * * *